United States Patent Office 3,388,122
Patented June 11, 1968

3,388,122
CERTAIN N-ACYL-3-AZABICYCLO-(3.2.2)NONANE COMPOUNDS
Don R. Baker, Pinole, Mervin E. Brokke, Richmond, and Duane R. Arneklev, Sunnyvale, Calif., assignors to Stauffer Chemical Company, New York, N.Y., a corporation of Delaware
No Drawing. Filed Oct. 8, 1965, Ser. No. 494,235
4 Claims. (Cl. 260—239)

ABSTRACT OF THE DISCLOSURE

Herbicidal azabicyclononanes having the general formula

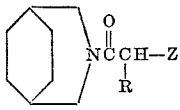

wherein R is selected from the group consisting of hydrogen and lower alkyl and Z is a member selected from the group consisting of halogen, trihaloacetoxy, thiocyano, and lower alkyl sulfonato. Representative compounds are: 3 - (chloroacetyl) - 3 - azabicyclo(3.2.2) - nonane, 3($\alpha$-bromopropionyl)-3-azabicyclo(3.2.2) - nonane, 3-(2-trichloroacetyloxyacetyl)-3-azabicyclo(3.2.2)nonane, 3-(2-thiocyanoacetyl) - 3 - azabicyclo(3.2.2)nonane, and 3-2-methanesulfonoxyacetyl)-3-azabicyclo(3.2.2) nonane.

---

This invention relates to certain new and novel organic compounds which may be used as effective herbicides. More specifically, the invention relates to certain azabicyclononanes and to the use of said compounds in herbicidal compositions.

The compounds comprising the instant class correspond to the general formula

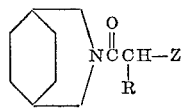

wherein R is selected from the group consisting of hydrogen and lower alkyl and Z is a member selected from the group consisting of halogen, trihaloacetoxy, thiocyano and lower alkyl sulfonato.

The compounds herein contemplated can be prepared by several methods. One such general method applied in preparing the haloacetyl derivatives was the condensation reaction between 3-azabicyclo-(3.2.2)nonane and appropriate haloacetyl chloride in the presence of a hydrogen chloride acceptor. The general method applied in preparing the substituted-acetyloxyacetyl derivatives and sulfonoxyacetyl derivatives was the condensation between 3-(hydroxyacetyl)-3-azabicyclo-(3.2.2)nonane and the appropriate substituted-acetyl chloride in the presence of a hydrogen chloride acceptor.

The thiocyanoacetyl derivatives were prepared by condensation of the chloroacetyl azabicyclononane and the alkali metal thiocyanate. The above described general methods proceed rapidly in the liquid phase. The employment of an inert organic solvent is also useful, facilitating processing as well as agitation of the reactants. Temperatures that permit operation in the liquid phase and which allow controllable reaction conditions are employed.

It has been found that the compounds of the present invention are particularly effective as herbicides. They are effective in the control of the growth of grasses and broadleaf plants with both pre-emergence and post-emergence activity.

The compounds of the present invention may be made in accordance with the following examples.

Example 1.—Preparation of 3-(chloroacetyl)-3-azabicyclo(3.2.2)nonane 3-azabicyclo(3.2.2)nonane (89.4 g.) and triethylamine (100 ml.) were dissolved in 500 ml. of tetrahydrofuran. While maintaining the temperature at 0–10° C., chloroacetyl chloride (54.3 g.) was added dropwise to this solution. The solution was agitated during the addition and after the addition was complete, the reaction mixture was stirred at room temperature for one hour. The volatile organic portion was evaporated under reduced pressure. The residue was dissolved in benzene, washed with water, dried and the benzene evaporated. The product was crystallized from isoheptane. There was obtained 124 g. of the title compound, M.P. 65–68° C.

Analysis.—Calculated for $C_{10}H_{16}ClN \cdot \frac{1}{2}H_2O$: carbon, 57.1; hydrogen, 7.65. Found: carbon, 57.72; hydrogen, 7.45.

Example 2.—Preparation of 3-($\alpha$-bromopropionyl)-3-azabicyclo(3.2.2)none

By a similar procedure as used in Example 1, the title compound was prepared from $\alpha$-bromopropionyl chloride and 3-azabicyclo(3.2.2)nonane; M.P. 86–88° C.

Example 3.—Preparation of 3-(2-trichloroacetyloxyacetyl-3-azabicyclo(3.2.2)nonane In order to prepare the title compound it was necessary first to prepare 3-(hydroxyacetyl)-3-azabicyclo (3.2.2)nonane. A mixture of glycolic acid (43 g., 70 percent) and mesitylene (20 ml.) were heated to 160° C. with the removal of water. 3-azabicyclo(3.2.2)nonane was added in small portions and the heating was continued with the removal of water until the reaction vessel temperature reached 200° C. Upon cooling, the product crystallized, M.P. 29–35° C.

This material was used in preparing the title compound of this example. By a procedure similar to Example 1, 3-(hydroxyacetyl) - 3 - azabicyclo(3.2.2)nonane was condensed with trichloroacetyl chloride in the presence of a hydrogen chloride acceptor, triethylamine. The title compound has a melting point of 106–112° C.

Example 4.—Preparation of 3-(2-thiocyanoacetyl)-3-azabicyclo(3.2.2)nonane 3-(chloroacetyl) - 3 - azabicyclo(3.2.2)nonane (12.0 g.) and 10 g. of sodium thiocyanate were dissolved in 200 ml. of ethanol and heated under reflux for 16 hours. The solvent was removed under reduced pressure. The residue was taken up in benzene, washed with water, dried over anhydrous magnesium sulfate and evaporated. There was obtained 10.0 g. of the title compound. Infrared analysis confirmed the expected structure.

Example 5.—Preparation of 3-(2-methanesulfonoxyacetyl)-3-azabicyclo(3.2.2)nonane 3 - (hydroxyacetyl) - 3 - azabicyclo(3.2.2)nonane (9.1 g.) was dissolved in 200 ml. of tetrahydrofuran containing 7 ml. of methanesulfonyl chloride. The resulting solution was treated dropwise at room temperature with 8 ml. of triethylamine. The mixture was stirred for one hour. The solvent was removed under reduced pressure. The residue was taken up in benzene, washed with water, dried over anhydrous magnesium sulfate and evaporated. There was obtained 9.0 g. of the title compound, $n_D^{30}=1.5029$.

TABLE I

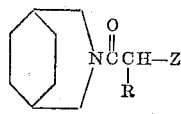

| Compound Number | R | Z | M.P. or $n_D^{30}$ |
|---|---|---|---|
| 1 | H | Cl | 65–68° C. |
| 2 | CH₃ | Br | 86–88° C. |
| 3 | H | OCOCCl₃ | 106–112° C. |
| 4 | H | OCOCF₃ | (Amber liquid.) |
| 5 | H | SCN | (Dark oil.) |
| 6 | H | OSO₂CH₃ | 1.5029. |

As previously mentioned, the herein described novel composition produced in the above described manner are phytotoxic compounds which are useful and valuable in controlling various plant species. The compounds of this invention were tested as herbicides in the following manner.

Pre-emergence herbicide test.—The seeds of crab grass, annual bluegrass, watergrass, red oats, pigweed, mustard and curly dock were planted in individual rows one-half inch deep in Santa Cruz sandy loam soil contained in compressed paper flats 8¼" x 6½" which are 2¾" deep. Enough seeds were planted to give about thirty to fifty plants of each of the weed species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

TABLE II
[Pre-emergence activity rate, 20 lbs./a.]

| Compound Number | Crab grass | Annual bluegrass | Water grass | Red oats | Pigweed | Mustard | Curled Dock |
|---|---|---|---|---|---|---|---|
| 1 | +++ | +++ | +++ | +++ | +++ | +++ | +++ |
| 2 | +++ | +++ | +++ | ++ | ++ | | |
| 3 | +++ | +++ | +++ | +++ | +++ | + | + |
| 4 | + | ++ | +++ | ++ | | | |
| 5 | +++ | +++ | +++ | + | +++ | | |
| 6 | +++ | +++ | +++ | +++ | +++ | ++ | ++ |

+=slight injury; ++=moderate injury; +++=severe injury or death.

Post-emergence herbicide test.—The seeds of five weed species, crab grass, watergrass, red oats, mustard, curled dock, and one crop, pinto beans (*Phaseolus vulgaris*) were planted in individual rows as described in the pre-emergence test, supra. Two weeks after planting the plant foliage was sprayed with a solution of the test compounds at a rate equivalent to 12.5 pounds/acre. The treated plants were placed back in the greenhouse. Injury ratings were recorded 14 days after treatment. The rating system is the same as that used in the pre-emergence test. Table III lists the results obtained therefrom.

TABLE III
[Post-emergence activity rate 1.25 lbs./a.]

| Compound Number | Crab grass | Water grass | Red oats | Mustard | Curled dock | Pinto beans |
|---|---|---|---|---|---|---|
| 1 | +++ | ++ | +++ | +++ | +++ | + |
| 2 | +++ | +++ | ++ | ++ | ++ | +++ |
| 3 | +++ | + | + | ++ | | +++ |
| 4 | ++ | + | | | +++ | |
| 5 | ++ | | ++ | ++ | ++ | +++ |
| 6 | ++ | ++ | ++ | +++ | +++ | +++ |

On further evaluation of pre-emergence activity compound number 1 produced 75% or better control of four grasses at at least one broadleaf species at 2 lbs. per acre. Compound number 6 exhibited 90% or better control on the four grass species.

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays, or drenches. The amount applied will depend upon the nature of the seeds or plants to be controlled and the rate of application may vary from 1 to 50 pounds per acre. One particularly advantageous way of applying the herbicidal composition comprising the adjuvant and an effective amount of a compound of the present invention is a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

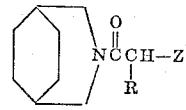

wherein R is selected from the group consisting of hydrogen and lower alkyl, and Z is a member selected from the group consisting of trihaloacetoxy, thiocyano, and methyl sulfonato.

2. The compound, 3-(2-trifluoroacetyloxyacetyl)-3-azabicyclo(3.2.2)nonane.

3. The compound, 3-(2-thiocyanoacetyl)-3-azabicyclo-(3.2.2)nonane.

4. The compound, 3-(2-methanesulfonoxyacetyl)-3-azabicyclo(3.2.2)nonane.

References Cited

UNITED STATES PATENTS 3,334,087    8/1967    Brown et al. _____ 260—239

OTHER REFERENCES

Brown et al.: I & EC Product Research and Development, vol. 4, pp. 40, 42, 47 (1965).

ALTON D. ROLLINS, *Primary Examiner.*

UNITED STATES PATENT OFFICE
Certificate

Patent No. 3,388,122                                                                     Patented June 11, 1968

Don R. Baker, Mervin E. Brokke, and Duane R. Arneklev

Application having been made jointly by Don R. Baker, Mervin E. Brokke and Duane R. Arneklev, the inventors named in the patent above identified, and Stauffer Chemical Company, New York, New York, a corporation of Delaware, the assignee, for the issuance of a certificate under the provisions of Title 35, Section 256 of the United States Code, deleting the names of the said Don E. Baker and Duane R. Arneklev from the patent as joint inventors, and a showing and proof of facts satisfying the requirements of the said section having been submitted, it is this 18th day of November 1969, certified that the names of the said Don E. Baker and Duane R. Arneklev are hereby deleted from the said patent as joint inventors with the said Mervin E. Brokke.

[SEAL]

WILLIAM E. SCHUYLER, JR.,
                                                                               *Commissioner of Patents.*